United States Patent
Galloway

(10) Patent No.: US 9,099,924 B2
(45) Date of Patent: Aug. 4, 2015

(54) TARGET VOLTAGE GENERATOR FOR A DC TO DC CONVERTER, A COMBINATION OF A TARGET VOLTAGE GENERATOR AND A DC TO DC CONVERTER, AND A METHOD OF OPERATING A DC TO DC CONVERTER

(71) Applicant: Analog Devices, Inc., Norwood, MA (US)

(72) Inventor: Gavin Galloway, Glasgow (GB)

(73) Assignee: Analog Devices, Inc., Norwood, MA (US)

(*) Notice: Subject to any disclaimer, the term of this patent is extended or adjusted under 35 U.S.C. 154(b) by 143 days.

(21) Appl. No.: 13/710,978

(22) Filed: Dec. 11, 2012

(65) Prior Publication Data
US 2014/0159679 A1    Jun. 12, 2014

(51) Int. Cl.
| H02M 3/156 | (2006.01) |
| H02M 3/158 | (2006.01) |
| H02M 3/157 | (2006.01) |
| H02M 1/00 | (2007.01) |

(52) U.S. Cl.
CPC ............ *H02M 3/1588* (2013.01); *H02M 3/156* (2013.01); *H02M 3/157* (2013.01); *H02M 2001/0025* (2013.01); *Y02B 70/1466* (2013.01)

(58) Field of Classification Search
CPC ..................... H02M 3/145; H02M 2003/1566; H02M 3/155; H02M 3/156; H02M 3/157; H02M 2001/0025
USPC .................................. 323/282, 284, 285, 351
See application file for complete search history.

(56) References Cited

U.S. PATENT DOCUMENTS

| 5,770,940 | A | 6/1998 | Goder | |
| 8,421,424 | B2 * | 4/2013 | Ishii | 323/222 |
| 8,860,391 | B2 * | 10/2014 | Noda | 323/282 |
| 2004/0207375 | A1 * | 10/2004 | Umemoto et al. | 323/282 |
| 2005/0116698 | A1 | 6/2005 | Prinz et al. | |
| 2007/0170904 | A1 * | 7/2007 | Hojo | 323/284 |
| 2007/0222423 | A1 | 9/2007 | Chen et al. | |
| 2011/0122660 | A1 | 5/2011 | Cacciotto | |
| 2013/0049725 | A1 * | 2/2013 | Yashiki | 323/282 |

FOREIGN PATENT DOCUMENTS

| EP | 1965496 A2 | 9/2008 |
| WO | WO-2014093090 A1 | 6/2014 |

OTHER PUBLICATIONS

"International Application Serial No. PCT/US2013/073060, International Search Report mailed May 30, 2014", 4 pgs.
"International Application Serial No. PCT/US2013/073060, Written Opinion mailed May 30, 2014", 5 pgs.
Dancy, Abram P, et al., "Ultra Low Power Control Circuits for PWM Converters", Power Electronics Specialists Conference, 28th Annual IEEE, vol. 1, (Jun. 22, 1997), 21-27.

* cited by examiner

*Primary Examiner* — Gary L Laxton
(74) *Attorney, Agent, or Firm* — Schwegman Lundberg & Woessner, P.A.

(57) ABSTRACT

A target voltage generator for use with a DC to DC converter, the DC to DC converter having a first input for receiving a voltage to be converted, an output for outputting a converted voltage, a first reference voltage input for receiving a first reference voltage and a controller arranged to compare the output voltage of the DC to DC converter with the first reference voltage and to modify the operation of the DC to DC converter so as to reduce a difference between the output voltage and the first reference voltage; the target voltage generator comprising a circuit arranged to compare the output voltage of the DC to DC converter with a second reference voltage and to use a result of the comparison to generate or modify the first reference voltage.

19 Claims, 6 Drawing Sheets

US 9,099,924 B2

TARGET VOLTAGE GENERATOR FOR A DC TO DC CONVERTER, A COMBINATION OF A TARGET VOLTAGE GENERATOR AND A DC TO DC CONVERTER, AND A METHOD OF OPERATING A DC TO DC CONVERTER

FIELD OF THE INVENTION

The present invention relates to a target voltage generator for use with a switching DC to DC converter, to a combination of a target voltage generator and a switching converter, and to a method of operating a switching converter.

BACKGROUND

Switching converters in which transistor switches are driven between fully on and fully off provide great efficiency improvements over dissipative style converters in which a transistor is used in a linear mode to drop a voltage across the transistor while current flows through the transistor such that a voltage at a terminal thereof, such as an emitter, collector or source or drain of the transistor is held at a desired output voltage. However, switching converters can exhibit degraded output voltage regulation under certain circumstances.

SUMMARY OF THE INVENTION

According to a first aspect of the present invention, there is provided a target voltage generator for use with a DC to DC converter, the DC to DC converter having a first input for receiving a voltage to be converted, an output for outputting a converted voltage, a first reference voltage input for receiving a first reference voltage and a controller arranged to compare the output voltage of the DC to DC converter with the first reference voltage and to modify the operation of the DC to DC converter so as to reduce a difference between the output voltage and the first reference voltage. The target voltage generator comprises a circuit arranged to compare the output voltage of the DC to DC converter with a second reference voltage and to use a result of the comparison to generate or modify the first reference voltage.

It is thus possible to modify a target voltage supplied to a DC to DC converter so as compensate for performance degradation within a switched mode converter.

The controller may be associated with a buck converter (step down), a boost converter (step up) or a buck-boost converter.

According to a second aspect of the present invention there is provided a DC to DC converter, comprising: a DC to DC pulse width modulated voltage converter having a first control loop for comparing an output voltage with a first reference voltage; and a second control loop having a response time which is slower than a response time of the first control loop, said second control loop being arranged to compare the output voltage with a second reference voltage and as a result of that comparison to modify the first reference voltage.

According to a third aspect of the present invention there is provided a method of operating a DC to DC converter, where said converter is arranged to compare a DC to DC converter output voltage with a first reference voltage, and to modify its operation as a result of the comparison, the method comprising comparing the DC to DC converter output voltage with a second reference voltage, and using the result of the comparison to generate or modify the first reference voltage.

BRIEF DESCRIPTION OF THE DRAWINGS

Example embodiments will now be described, in a non-limiting manner, with reference to the accompanying drawings, in which.

DESCRIPTION OF EXAMPLE EMBODIMENTS

Figure 1:
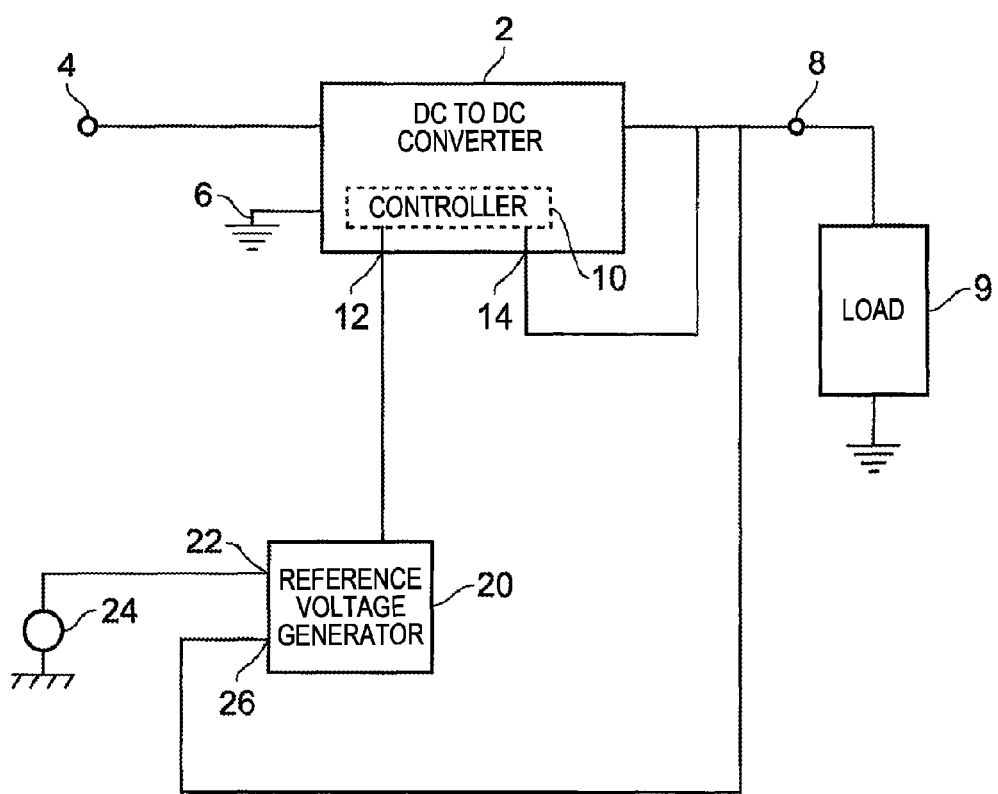
FIG. 1 is a circuit diagram of a DC to DC converter in association with an embodiment of a reference voltage generator.

FIG. 1 is a circuit diagram of a DC-DC converter, generally designated 2. The DC-DC converter of FIG. 1 is a buck converter, also known as a buck regulator, which receives a first potential difference between a first input node 4 and a second input node 6, and which outputs a reduced voltage difference between an output node 8 and the second input node 6.

A buck regulator is often used with battery powered equipment where, for example, an anode of a battery or battery array is connected to the first input node 4 and the cathode of the battery or battery array is connected to the second input node 6. Typically, because the voltages in an item of battery powered equipment can float with respect to earth, it is convenient to regard the battery cathode as defining a local 0 V reference or a local ground.

The DC to DC converter 2 may be a known switching converter. Such a converter may have an embedded or associated controller 10, shown in FIG. 1 as being internal to the DC to DC converter 2 which receives a reference voltage, which herein will be referred to as a first reference voltage, at a first reference voltage input node 12. The controller 10 also receives the output voltage from the output node 8 at a feedback node 14, and as a result of comparing the first reference voltage with the output voltage, it implements one of several known control schemes to maintain the output voltage as a desired value.

These control schemes are generally well behaved when the difference between the first potential, (the input voltage) and the output voltage is within a certain operating range specific to the implementation of the DC to DC converter, and/or when the load current from the converter is within a specific operating range. In these instances the specific operating ranges are within the minimum to maximum input voltage range, and within the minimum to maximum load current range for which the DC to DC converter was designed.

However, unlike the prior art converters or regulators, the circuit of FIG. 1 further includes a reference voltage generator 20 which receives a second reference voltage at a second reference voltage input 22. The second reference voltage may be provided by a precision voltage source 24. A second input 26 of the reference voltage generator 20 forms an estimate of the error between the second reference voltage and the DC to DC converter output voltage, and this estimate of error is used to generate the first reference voltage which is supplied by the reference voltage generator 20 to the first reference voltage input node 12 of the DC to DC converter 2.

In order to understand why it is desirable to provide the reference voltage generator 20, rather than connecting the precision voltage reference source 24 directly to the first reference voltage input 12, it is helpful to briefly consider the operation of a DC to DC switching converter.

Figure 2:
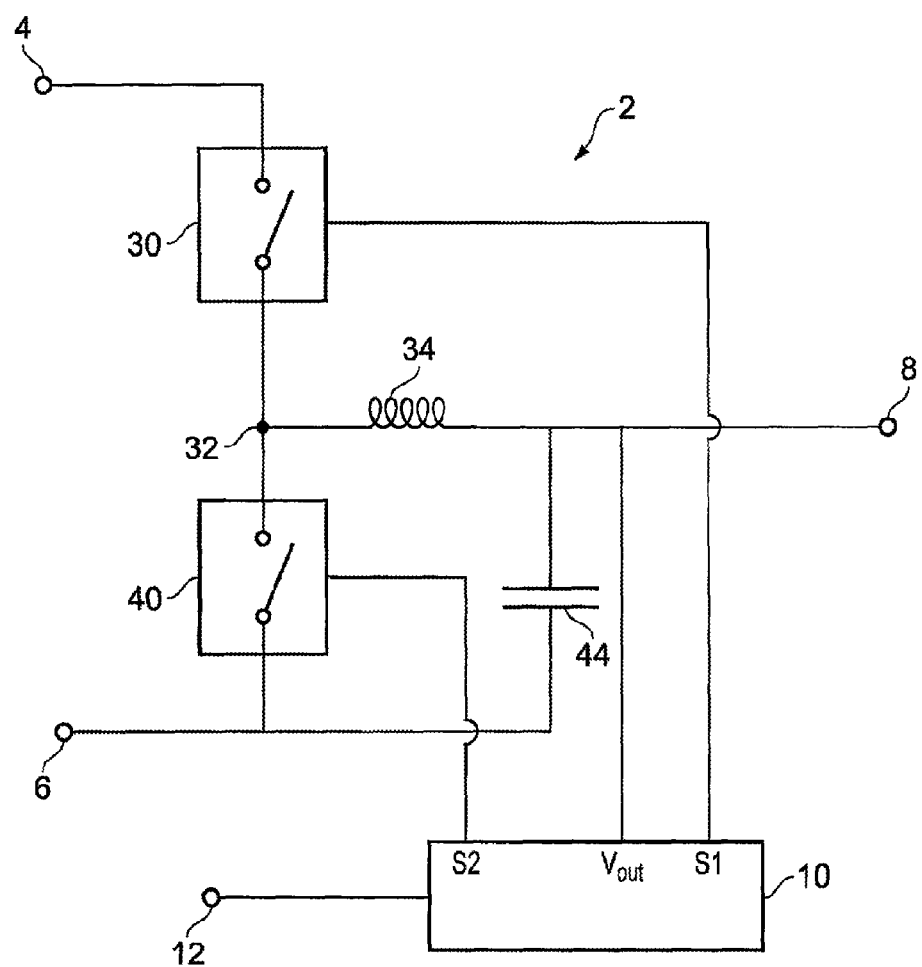
FIG. 2 is a circuit diagram showing an example of a switched mode buck converter in greater detail.

FIG. 2 shows the internal configuration of a buck converter. It should be noted that the invention is not limited to use with buck converters and the concepts and embodiments described herein can be used with boost converters and buck-boost converters. A first electrically controlled switch 30, which can be regarded as being a high side switch, is connected between the first input node 4 and a common node 32. A first end of an inductor 34 is connected to the common node 32. A second end of the inductor is connected to the output node 8. The first electrically controlled switch 30 is responsive to a first switch control signal Si provided by the controller 10.

A second electrically controlled switch 40, which can be regarded as a low side switch, is connected between the common mode 32 and the second input node 6. The second electrically controlled switch 40 is responsive to a second switch control signal S2 provided by the controller 10.

The controller 10 has an "output voltage" input $V_{out}$ connected to the output node 8. The controller, in use, acts to compare the output voltage at node 8 with a first reference voltage, $V_{ref}$, which is provided at a first reference voltage input 12 of the controller 10.

Suppose the voltage at the first input terminal 4 is V1, the voltage at the second input terminal 6 is V2 and the output voltage at the output node is $V_{out}$.

In use V1 > $V_{out}$, and $V_{out}$ > V2.

The controller 10 is arranged to operate the first switch 30 and the second switch 40 in a pulse width modulated manner so as to successively build and then reduce current flow in the inductor 34.

In a first phase, which can be regarded as a current build phase, the first switch 30 is closed.

The voltage $V_{ind}$ across the inductor 34 is approximately:

$$V_{ind} \approx V1 - V_{out} \qquad \text{equation 1}$$

And the rate of increase in current within the inductor 34, having an inductance L is approximately $$\frac{dI}{dt} \approx \frac{(V1 - V_{out})}{L} \qquad \text{equation 2}$$

Figure 3:
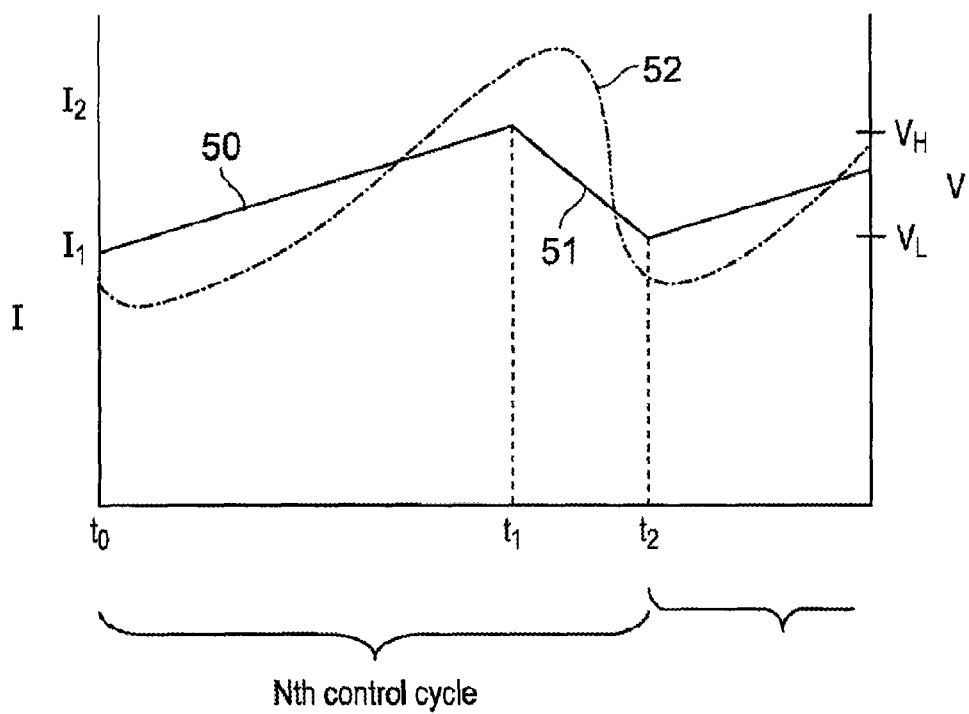
FIG. 3 shows a current waveform (solid line) and output voltage (chain-dot line) for a buck converter.

The current flows for a time t1, as shown in FIG. 3 by curve 50, during which it rises from a value I1 to I2, towards the output node 8. Some of the current exits the output node 8 to supply a load 9 connected to the output node.

Returning to FIG. 2, it can be seen that a capacitor 44 is connected between the output node 8 and the second input node 6. This acts as a reservoir capacitor to accept and store some of the charge.

The change in voltage at the capacitor C can be approximated as:

$$\Delta V_{out} \approx \int_0^{t_1} \frac{i_{capacitor}}{C} dt \qquad \text{equation 3}$$

where $i_{capacitor}$ is the amount of current that flows from the inductor 34 into the capacitor 44, and C is the capacitance of the capacitor.

The controller 10 may, for example, be a hysteretic controller which acts to keep the first switch 10 conducting until such time as $V_{out}$ has risen to an upper threshold $V_H$. It should however be noted that the nature of the controller or control scheme used to implement the pulse width modulation is not relevant to the present invention, and any suitable controller such as constant on or off time controllers, peak current mode or valley current mode or voltage mode controllers may be used. However, for ease of discussion, it will be assumed that the controller operates as a hysteretic controller and that the current drawn by the load is greater than a first current threshold, as often DC to DC converters are operable in a low power mode when the load current drops to a low value.

Once $V_{out}$ has risen to its upper threshold $V_H$, the controller 10 opens the first switch 30. After a brief delay to ensure that the first switch has become high impedance, the controller closes the second switch 40, thereby marking the commencement of a second phase in which the current in the inductor is reduced, and bringing the voltage at the first end of the inductor down to V2. In fact, it should be noted that since the current that had built in the coil during the first phase now flows through the second switch 40, there will be a small voltage dropped across the second switch 40. This small voltage drop is insignificant in terms of its impact on the analysis presented here, but it should be noted that this voltage drop can be exploited to measure the current magnitude and direction of current flow if desired.

During the second phase, the voltage across the inductor 34 can be written as $$V_{ind} = V2 - V_{out} \qquad \text{equation 4}$$

And the change in inductor current is $$\frac{dI}{dt} = \frac{V2 - V_{out}}{L} \qquad \text{equation 5}$$

Since V2 is less than $$V_{out}, \frac{dI}{dt}$$

is negative and the current in the inductor starts to reduce, as indicated in FIG. 3 by line 51 with the inductor current reducing from I2 to I1 in a period t2.

If, as is often the case, $V_{out}$ is much closer to one of V1 and V2 than the other one of V1 and V2, then the rates of current build and current decay are significantly different. The current waveform shown in FIG. 3 is indicative of a system where $V_{out}$ is much closer to V1 than it is to V2.

During the period from time t0 to time t1 some of the inductor current flows to the load. Further analysis reveals that at the moment the first switch 30 was switched off, the current in the inductor 34 was sufficient to meet the demand of the load 9 and to be charging the capacitor 44 so as to increase the voltage on the capacitor.

When the second switch 40 is turned on, the magnitude of the current is, to a first approximation, unchanged, so the output voltage $V_{out}$ briefly continues to rise until such time as the inductor current reduces to become less than the load current, and as a consequence the capacitor 44 starts to supply current to the load. The voltage on the capacitor starts to fall, and the controller 10 is responsive to this, and keeps the second switch 40 in a conducting state until such time as the output voltage $V_{out}$ has fallen to a lower threshold value $V_L$.

Once $V_L$ is reached, at time t2, the second switch 40 is made high impedance. The high side (first) switch 30 is closed, but there is a delay between this occurring and the current building to a level that stops some of the current to the load being supplied from the capacitor. Therefore, initially the voltage continues to fall. The time period t0 to t2 represents the duration of one control cycle of the DC-DC converter. Once one, i.e. Nth, control cycle has completed, a subsequent, N+1th, control cycle is commenced by the controller 10 opening the first switch 30 to cause current to build in the inductor.

The evolution of $V_{out}$ with respect to time for the scenario described above is shown in FIG. 3 by chain-dot curve 52.

In such a hysteretic control scheme the duration of each control cycle, and hence the switching frequency of the DC-DC converter, can be controlled by the difference between $V_H$ and $V_L$. This difference can be regarded as a hysteresis, and such a control scheme as described here is a hysteresis control scheme (or hysteretic control scheme).

The first and second switches 30 and 40 may have to operate vary rapidly (as a function of the PWM duty cycle and the switching frequency), and are often implemented as field effect transistors. For example when the load is drawing a relatively large current, the duration for which the second switch is conducting may be short. Put another way the duration for which the switch is on, which will be referred to as the switch "on" time may start to become comparable with the propagation delays within the controller. A similar problem may occur when the output is very lightly loaded.

These short "on" and "off" times, may start to become comparable with the sum of the comparator decision time, propagation delay in the control logic, and transistor switching times (which may vary between devices and with input voltage) and may give rise to unquantifiable degradation in performance. Much of the problem is addressed by the control loop within the controller 10 of the DC to DC converter 2. However there is an inherent trade off in controller performance because the controller needs to balance the needs of stability and voltage regulation against the need to be highly responsive to rapidly changing load currents drawn by the load.

Known DC to DC converters may include an error amplifier which amplifies the difference between the first reference voltage and the output voltage. Errors introduced by this error amplifier, the comparator and the switching logic and switches are effectively divided by the gain of the error amplifier when referenced to the output of the DC to DC converter. The error amplifier may be used to implement a low frequency pole, as this gives improved voltage regulation under steady state conditions, but at the expense of control loop bandwidth and hence responsiveness to step changes in load current.

The embodiment shown in FIG. 1 has the advantage that the feedback loop is effectively broken into two substantially independent feedback loops, although in topological terms they can be regarded as being nested. This means that the controller 10 of the DC to DC converter can be biased towards giving a good transient response. The second feedback loop formed by the reference voltage generator can be much slower, and be designed to achieve good regulation, and can compensate for delays in the switching circuits of the DC to DC converter, even when it is heavily loaded.

Figure 4:
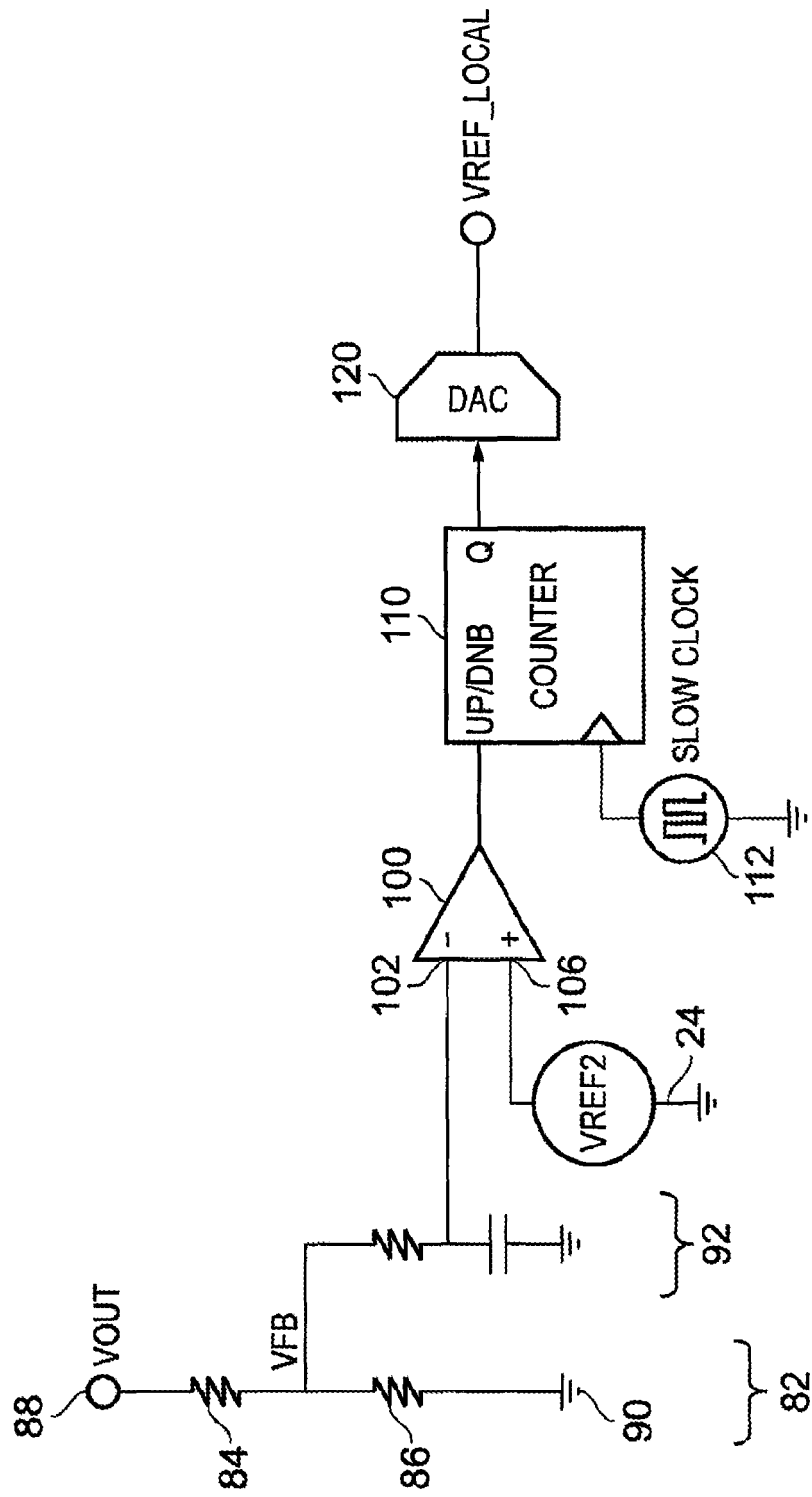
FIG. 4 is a circuit diagram of a first embodiment of a target voltage generator.

The second feedback loop is provided by a target voltage generator, an example of which will now be described with reference to FIG. 4.

The target voltage generator 20 comprises an input circuit, generally designated 82 which receives the output voltage of the DC to DC converter, and scales it if necessary using a potential divider formed by resistors 84 and 86 connected in series between an input node 88 and a local ground 90. The scaled feed-back voltage VFB may then be low pass filtered by a resistor and capacitor filter generally designated 92 so as to remove short term variations due to load transients or noise from the scaled feedback signal. The scaled feedback signal is, in the embodiment illustrated in FIG. 4 compared with a second reference voltage VREF2 from the precision voltage source 24 by a comparator 100. The scaled feedback signal is provided to a first input 102, such as an inverting input of the comparator 100 while a second reference voltage from the reference voltage generator 24 is provided to a second input of the comparator 100. An output of the comparator 100 is provided to a up/down control input of an up/down counter 110. The counter 110 is clocked at a relatively slow clock rate by a slow clock 112 such that the counter only updates periodically, and counts up if VFB is less than the second voltage reference VREF2, and counts down if VFB is greater than VREF2. The action of the counter is to integrate the output of the comparator 100 and in so doing the counter will get to a state where, if Vout is stable and unchanging, the value of the counter would dither about a value. The output of the counter is provided as an input to a digital to analog converter 120 which, in this embodiment, outputs a value VREF-LOCAL which acts as a voltage reference, i.e. the first reference voltage, used by the switched mode converter. Thus as the switching rate of the switched mode converter or the on and off time of the transistors vary such that propagation delays within the converter introduce unquantified voltage errors within the controller of the switched mode converter, the reference voltage generator integrates those errors and modifies the reference voltage supplied to the DC to DC converter so as to bring the output voltage thereof back towards the target voltage.

The counter 110 may be provided in association with an initialization circuit (not shown) to preload the counter to an initial value of VREF (the first reference voltage) at power up.

In an example, a DC to DC converter may have a first control loop with an open loop bandwidth around 15 to 20 or times slower than the converter switching frequency. Thus a converter having a switching frequency of 3 MHz may have an open loop bandwidth of around 180 kHz. The slow clock 112 may be set to be significantly slower than the open loop bandwidth, for example around 12 kHz (which is around 1/256 of the switching frequency as frequency division by powers of two is generally easy to implement). The DAC 120 may have a least significant bit size of less than 1%, for example of around 0.1%, of the reference voltage value. Thus the changes made are generally slow compared to the speed of the control loop provided by the controller 10, and small compared to the reference voltage.

Figure 5:
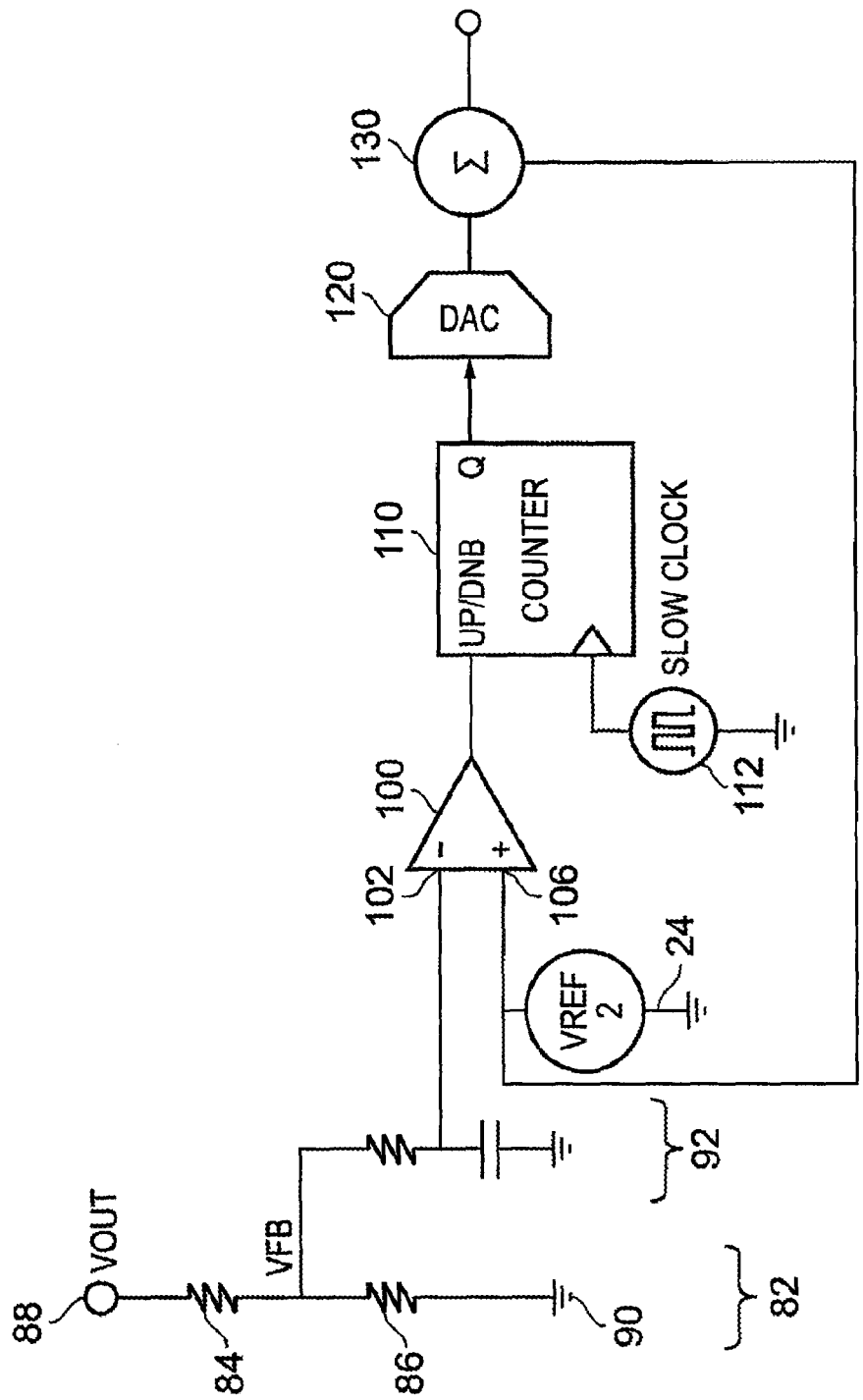
FIG. 5 is a circuit diagram of a second embodiment of a target voltage generator.

In an alternative embodiment, as shown in FIG. 5 the output of the DAC 120 may be combined with VREF2 by a summer 130. The summer may form a weighted average of VREF2 and the output of the DAC 120. This arrangement ensures that the first reference voltage always has an initial value close to VREF2. Additionally the changes made by the DAC 120 are relatively small steps, so the controller 10 does not become excessively perturbed by a change in the DAC output.

Figure 6:
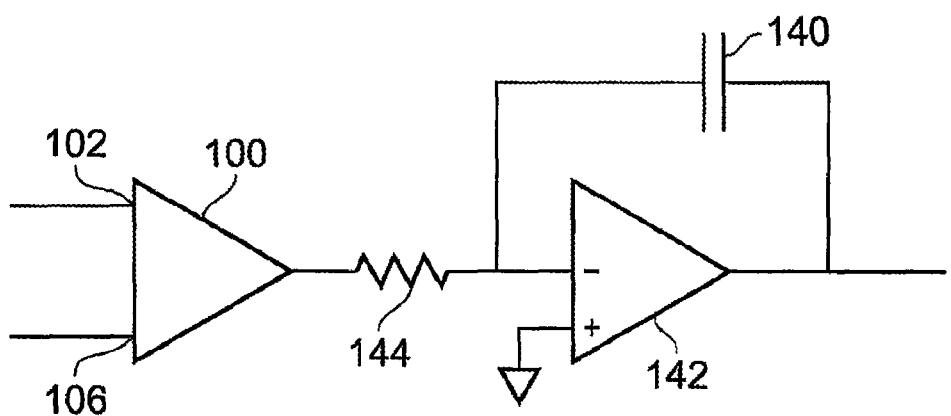
FIG. 6 is a circuit diagram showing a modification to part of the circuit shown in FIG. 4.

The target voltage generator may also be implemented in the analog domain as shown in FIG. 6.

In FIG. 6 the up/down counter 110 and the DAC 120 have been replaced by an integrator formed by a capacitor 140 placed in the feedback loop around an operational amplifier 142. The operational amplifier 142 is coupled to the output of the comparator 100 by a resistor 144 which restricts a rate of charge transfer of the capacitor 140.

It is thus possible to modify a known DC to DC converter and its controller by the provision of a reference voltage generator which can adapt a reference voltage supplied to the controller of the DC to DC converter so as to improve regulation at the output of the converter without compromising its responsiveness to load changes.

The claims presented herewith are in single dependency format. However, it is to be understood that the use of single dependency format was only adopted to comply with claims fee structures at the USPTO, and that for other jurisdictions each claim can be multiply dependent on any preceding claim (except where this is clearly not feasible) of the same category.

The invention claimed is:

1. A target voltage generator for use with a DC to DC converter, the DC to DC converter having a first input for receiving a voltage to be converted, an output for outputting a converted voltage, a first reference voltage input for receiving a first reference voltage and a controller arranged to compare the output voltage of the DC to DC converter with the first reference voltage and to modify the operation of the DC to DC converter so as to reduce a difference between the output voltage and the first reference voltage;
the target voltage generator comprising a circuit arranged to compare the output voltage of the DC to DC converter with a second reference voltage and to use a result of the comparison to generate or modify the first reference voltage; and
the target voltage generator comprising a comparator for comparing the output voltage with the second reference voltage and a counter for storing a result of the comparison.

2. The target voltage generator of claim 1, wherein the counter comprises an up/down counter, and the up/down counter is configured to be counted up in response to a first output state of the comparator and counted down in response to a second output state of the comparator.

3. The target voltage generator of-claim 2, wherein a clock rate of a clock used to clock the counter is set so as to provide a response rate of the target voltage generator which is slower than a response rate of the controller of the DC to DC converter.

4. The target voltage generator of claim 3, wherein a response rate of the target voltage generator is at least ten times slower than the response rate of the controller of the DC to DC converter.

5. The target voltage generator of claim 2, further comprising an analog to digital converter responsive to an output of the counter for generating the first reference voltage.

6. The target voltage generator of claim 5, further comprising an initialisation circuit for setting the counter to an initial value.

7. The target voltage generator of claim 2, further comprising an analog to digital converter responsive to the output of the counter for generating a modification voltage to be added to the second reference voltage so as to generate the first reference voltage.

8. The target voltage generator of claim 1, wherein the counter is configured to store an integrated result of a comparison provided by the comparator of the output voltage with the second reference voltage.

9. A DC to DC converter, comprising:
a DC to DC pulse width modulated voltage converter having a first control loop for comparing an output voltage with a first reference voltage; and a second control loop having a response time which is slower than a response time of the first control loop, said second control loop being arranged to compare the output voltage with a second reference voltage and, in response to a comparison of the output voltage with the second reference voltage, to modify the first reference voltage;
wherein the second control loop comprises a comparator for comparing the output voltage and the second reference voltage so as to determine at least the sign of an error there between, and a counter to be incremented or decremented in response to the sign of the error, the counter coupled to a voltage generator to generate the first reference voltage or a correction to the first reference voltage using an output of the counter.

10. The DC to DC converter of claim 9, wherein the response time of the second control loop is at least five times slower than the response time of the first control loop.

11. The DC to DC converter of claim 9, wherein a clock rate of a clock used to clock the counter is set so as to provide a response rate of the second control loop which is slower than a response rate of the first control loop.

12. The DC to DC converter of claim 9, further comprising an analog to digital converter responsive to an output of the counter for generating the first reference voltage.

13. The DC to DC converter of claim 9, further comprising an initialisation circuit for setting the counter to an initial value.

14. A method of operating a DC to DC converter, comprising:
comparing a DC to DC converter output voltage with a first reference voltage to provide a first control loop to control the DC to DC converter output voltage; and
modifying operation of the DC to DC converter, including:
comparing the DC to DC converter output voltage with a second reference voltage using a second control loop; and
using a result of the comparison provided by the second control loop to generate or modify the first reference voltage, the result stored using a counter coupled to a voltage generator to generate the first reference voltage or a correction to the first reference voltage using an output of the counter.

15. The method of claim 14, wherein comparing the output voltage with the second reference voltage comprises determining a sign of a difference, and periodically making an increase or a decrease to the second reference voltage based on the sign of the difference.

16. The method of claim 14, wherein storing the result using the counter includes incrementing the counter in response to a first output state of the comparator and decrementing the counter in response to a second output state of the comparator.

17. The method of claim 14, comprising establishing a clock rate of a clock used to clock the counter so as to provide a response rate of the second control loop which is slower than a response rate of the first control loop.

18. The method of claim 14, comprising generating the first reference voltage using an analog to digital converter responsive to an output of the counter.

19. The method of claim 14, comprising establishing an initial value for the counter using an initialisation circuit.

* * * * *